US011725929B2

United States Patent
Haverkamp

(10) Patent No.: US 11,725,929 B2
(45) Date of Patent: Aug. 15, 2023

(54) POSE MEASUREMENT IN A POSITIONING APPARATUS

(71) Applicant: Carl Zeiss Industrielle Messtechnik GmbH, Oberkochen (DE)

(72) Inventor: Nils Haverkamp, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 137 days.

(21) Appl. No.: 17/225,810

(22) Filed: Apr. 8, 2021

(65) Prior Publication Data
US 2021/0318112 A1 Oct. 14, 2021

(30) Foreign Application Priority Data

Apr. 8, 2020 (DE) .................. 10 2020 204 532.1

(51) Int. Cl.
*G01B 11/00* (2006.01)
*B25J 15/00* (2006.01)

(52) U.S. Cl.
CPC ......... *G01B 11/005* (2013.01); *B25J 15/0019* (2013.01)

(58) Field of Classification Search
CPC .......... G02B 27/017; G02B 2027/0138; G02B 2027/0187; G02B 27/0093; G02B 2027/014; G02B 2027/0181; G02B 2027/0141; G02B 2027/0178; G02B 27/0172; G02B 2027/0134; G02B 2027/0147; G02B 27/0179; G02B 27/64;
(Continued)

(56) References Cited

U.S. PATENT DOCUMENTS 4,606,696 A   8/1986   Slocum
5,177,563 A   *   1/1993   Everett .................. B25J 19/021
                                                      356/621
(Continued)

FOREIGN PATENT DOCUMENTS

CN       106403859 A   *   2/2017   .......... B25J 15/0019
CN       106132335 B   *   8/2019   ............. A61B 34/30
(Continued)

OTHER PUBLICATIONS

German Office Action for Patent Application No. DE 10 2020 204 532.1; dated Nov. 25, 2020; 6 Pages.

*Primary Examiner* — Michael P Stafira
(74) *Attorney, Agent, or Firm* — Miller Johnson

(57) ABSTRACT

A positioning apparatus with a pose measurement function includes a first and second kinematic links, a first measuring link attached to the second kinematic link, a joint connecting the first and second kinematic links, and a sensor capturing a measurement device. Either the measurement device or the sensor is arranged at the first measuring link and is movable jointly with the second kinematic link. The other one is arranged at the first kinematic link and is movable jointly with the first kinematic link. An attachment location of the first measuring link lies closer to an end of the second kinematic link that is remote from the joint than to the joint. The positioning apparatus is configured to ascertain, based on data captured by the sensor, a first relative pose value corresponding to the degree of freedom of the joint and a further relative pose value for another degree of freedom.

21 Claims, 4 Drawing Sheets

(58) Field of Classification Search

CPC ............ G02B 27/642; G02B 2027/0174; G02B 5/32; G02B 27/0087; G02B 26/0875; G02B 26/101; G02B 3/08; G02B 5/208; G02B 5/26; G02B 7/102; G01B 11/26; G01B 11/005; G01B 5/008; G01B 11/2531; G01B 11/2545; G01B 11/2755; G01B 21/20; G01B 21/30; G01B 2210/143; G01B 2210/146; G01B 2210/20; G01B 11/25; G01B 21/047; G01B 11/16; G01B 11/165; G01B 21/045; G01B 11/002; G01B 21/04; G01B 11/03; G01B 5/0004; G01B 11/24; G01B 11/2513; G01B 21/00; G01B 11/14; G01B 2210/58; G01B 21/042; G01B 5/004; G01B 7/004; G01B 7/008; G01B 11/007; G01B 11/2433; G01B 21/22; G01B 11/00; G01B 21/02; G01B 5/0002; G01B 7/012; G01B 11/02; G01B 11/026; G01B 5/012; G01B 5/08; G01B 11/18; G01B 21/16; G01B 3/11; G01B 7/026; G01B 7/30; G01B 11/04; G01B 11/27; G01B 15/06; G01B 17/00; G01B 21/24; G01B 2210/54; G01B 3/008; G01B 5/0009; G01B 5/14; G01B 5/24; G01B 11/254; G01B 5/0016; G01B 7/00; G01B 7/02; G01B 7/144; G01B 7/16; G01B 7/24; G01B 7/312; B25J 9/1689; B25J 9/1633; B25J 9/1697; B25J 9/1692; B25J 9/1664; B25J 9/0006; B25J 9/1682; B25J 9/16; B25J 13/085; B25J 9/161; B25J 9/104; B25J 13/00; B25J 9/1607; B25J 9/1676; B25J 9/1694; B25J 3/04; B25J 13/08; B25J 9/06; B25J 9/163; B25J 9/1653; B25J 19/023; B25J 9/1641; B25J 9/1674; B25J 13/088; B25J 3/00; B25J 13/02; B25J 15/04; B25J 15/02; B25J 15/0066; B25J 9/1602; B25J 5/007; B25J 9/042; B25J 5/00; B25J 19/021; B25J 9/0087; B25J 19/0004; B25J 9/1612; B25J 11/00; B25J 17/00; B25J 19/02; B25J 9/1623; B25J 9/1671; B25J 9/1638; B25J 9/1666; B25J 9/1615; B25J 19/0091; B25J 19/04; B25J 9/0003; B25J 18/04; B25J 18/00; B25J 9/0084; B25J 17/0266; B25J 9/1628; B25J 9/1605; B25J 9/04; B25J 9/1679; B25J 9/1656; B25J 13/025; B25J 9/046; B25J 15/0019; B25J 9/126; B25J 9/1687; B25J 9/043; B25J 9/10; B25J 9/00; B25J 11/005; B25J 11/0095; B25J 13/06; B25J 13/089; B25J 9/142; B25J 9/1661; B25J 9/023; B25J 17/0216; B25J 5/02; B25J 9/1075; B25J 19/0016; B25J 9/162; B25J 19/0095; B25J 9/02; B25J 9/08; B25J 9/009; B25J 9/12; B25J 9/1669; B25J 17/02; B25J 19/00; B25J 9/003; B25J 9/0081; B25J 9/1065; B25J 9/1651; B25J 13/084; B25J 9/1635; B25J 15/0616; B25J 18/002; B25J 9/106; B25J 19/0012; B25J 19/06; B25J 11/0075; B25J 13/086; B25J 9/0072; B25J 15/0052; B25J 13/087; B25J 15/0014; B25J 15/0095; B25J 5/005; B25J 9/0009; B25J 9/105; B25J 1/02; B25J 11/0055; B25J 11/007; B25J 15/0009; B25J 17/025; B25J 18/025; B25J 13/065; B25J 19/0008; B25J 7/00; B25J 9/0012; B25J 9/0051; B25J 9/1035; B25J 9/1684; B25J 13/081; B25J 15/12; B25J 18/007; B25J 18/02; B25J 18/06; B25J 9/1643; B25J 11/009; B25J 17/0258; B25J 9/047; B25J 15/00; B25J 15/0028; B25J 17/0275; B25J 9/1015; B25J 9/146; B25J 11/002; B25J 11/0065; B25J 11/008; B25J 15/0233; B25J 15/08; B25J 19/007; B25J 9/0057; B25J 9/0078; B25J 9/065; B25J 9/103; B25J 13/003; B25J 15/0206; B25J 15/0433; B25J 15/06; B25J 17/0283; B25J 9/0015; B25J 9/0039; B25J 9/0066; B25J 9/0069; B25J 9/026; B25J 9/045; B25J 9/1005; B25J 9/102; B25J 9/1045; B25J 9/1648; B25J 13/082; B25J 15/0038; B25J 15/0071; B25J 15/0608; B25J 19/0029; B25J 9/041; B25J 9/1025; B25J 9/109; B25J 9/1617; B25J 11/006; B25J 11/0085; B25J 15/0004; B25J 15/0057; B25J 19/002; B25J 19/0037; B25J 19/0066; B25J 19/0075; B25J 19/022; B25J 19/025; B25J 21/00; B25J 3/02; B25J 9/0018; B25J 9/0033; B25J 9/0036; B25J 9/0063; B25J 9/0096; B25J 9/044; B25J 9/123; B25J 9/1625; B25J 15/0061; B25J 15/0253; B25J 15/028; B25J 15/0491; B25J 15/10; B25J 19/0025; B25J 19/068; B25J 21/005; B25J 21/02; B25J 5/06; B25J 9/0048; B25J 9/0075; B25J 9/0093; B25J 9/1085; B25J 9/14; B25J 9/148; B25J 9/1658

See application file for complete search history.

(56) References Cited

U.S. PATENT DOCUMENTS

| | | | |
|---|---|---|---|
| 6,633,051 | B1 | 10/2003 | Holloway et al. |
| 9,671,257 | B2 | 6/2017 | Held et al. |
| 10,429,178 | B2 | 10/2019 | Held et al. |
| 2014/0167745 | A1 | 6/2014 | Held et al. |
| 2017/0234681 | A1 | 8/2017 | Held et al. |
| 2019/0143506 | A1* | 5/2019 | Rabindran ............ B25J 9/1689 700/253 |
| 2020/0049477 | A1* | 2/2020 | Lankalapalli ........ G01B 11/005 |
| 2020/0139557 | A1 | 5/2020 | Gradener et al. |

FOREIGN PATENT DOCUMENTS

| | | | | |
|---|---|---|---|---|
| DE | 4314597 | A1 * | 11/1994 | ............ B23Q 17/22 |
| EP | 1633534 | A1 | 3/2006 | |
| EP | 1920215 | A2 | 5/2008 | |
| EP | 2092269 | B1 | 8/2009 | |
| EP | 2732934 | A2 | 5/2014 | |
| WO | WO-2004096502 | A1 | 11/2004 | |
| WO | WO-2007017235 | A2 | 2/2007 | |
| WO | WO-2008064276 | A2 * | 5/2008 | ........... G01B 21/047 |
| WO | WO-2013007285 | A1 | 1/2013 | |
| WO | WO-2013180938 | A1 | 12/2013 | |
| WO | WO-2017042134 | A1 * | 3/2017 | ........... G01B 11/005 |
| WO | WO-2018115248 | A1 * | 6/2018 | ......... E04G 21/0436 |
| WO | WO-2018199947 | A1 * | 11/2018 | ............ B25J 9/1692 |
| WO | WO-2019011381 | A1 | 1/2019 | |
| WO | WO-2019110051 | A1 | 6/2019 | |
| WO | WO-2019162697 | A1 * | 8/2019 | ............ B25J 9/1692 |

* cited by examiner

POSE MEASUREMENT IN A POSITIONING APPARATUS

CROSS-REFERENCE TO RELATED APPLICATIONS

This application claims priority to DE 10 2020 204 532.1 filed Apr. 8, 2020, the entire disclosure of which is incorporated by reference.

FIELD

The present disclosure relates to industrial metrology and product manufacturing and more particularly to a positioning apparatus having a pose measurement function.

BACKGROUND

It is known to measure objects and in particular industrially manufactured workpieces using coordinate measuring machines. In this way, in particular surface coordinates of the workpiece in a reference coordinate system can be ascertained, for example to check geometric properties thereof. A measuring sensor, which may be based for example on tactile or optical measurement principles, is in this case typically positioned and aligned relative to the workpiece by the coordinate measuring machine. For this purpose, the coordinate measuring machine has a movement kinematic system having generally a plurality of movement axes that are individually driven. In particular, linear movement axes that extend, for example, orthogonally to one another can be provided. By reading position values of the movement axes of the coordinate measuring machine and/or any measurement values ascertained by the measuring sensor (for example distance measurement values), spatial coordinate values of the object can be determined.

Owing to their limited work space and the spatial arrangement of their movement axes, typical coordinate measuring machines are usually not suitable for processing workpieces. Rather, the coordinate measuring machines and in particular their kinematic systems are usually optimized merely for workpiece measurements.

On the other hand, manufacturing apparatuses and in particular industrial robots (in particular 6-axis articulated robots) that are frequently used are not suitable for coordinate measurements. For instance, industrial robots exhibit increased temperature expansions and/or deform relatively strongly under loads. However, a pose measuring system of the robot, which typically consists of rotary encoders, is able to capture such influences only to a limited extent. A robot position calculated based on the rotary encoder values alone can thus correspond to reality only to a limited extent.

In practice, this usually means that object manufacturing and object measurement are separate processes and even that different apparatuses are used therefor (for example a manufacturing robot for manufacturing and a separate coordinate measuring machine for the object measurement). This is disadvantageous for reasons of costs, transport, space and time.

That is why there exist approaches in the prior art for also integrating coordinate measuring functions into kinematic systems of manufacturing apparatuses and/or for designing kinematic systems that are suitable for both manufacturing and coordinate ascertainments. One objective in this case may be to ascertain coordinates of a processed workpiece and/or to ascertain coordinates of a predetermined reference point of an apparatus and in particular of a robot, such as its TCP (Tool Centre Point). It is possible to indirectly conclude from the latter coordinates (for example when knowing the dimension of a measuring sensor or tool arranged at the robot) coordinates of the workpiece, if contact herewith is ascertained.

For example, it is known to provide industrial robots with optically capturable marks or targets and to capture such marks using a camera system. Optical capturing can be understood to mean capturing electromagnetic radiation that corresponds in particular to the state of movement of the capturing structure, for example because, from the viewpoint of a measurement camera, it is reflected differently in accordance with the state of movement. The capturing of marks/targets is based on the idea that typical pose measuring systems of industrial robots, which typically consist of rotary encoders in the individual robot joints, do not have sufficient measurement accuracy, as mentioned above. By contrast, an actual 3D pose of the robot (that is to say its spatial pose) can be determined with the optically capturable marks independently of the rotary encoder measurement values.

However, one drawback in this case is that camera systems are not able to be operated reliably in all manufacturing environments, for example because of dirt or heat. The complexity of setting up also increases, and permissible robot movements may be limited because it must always be ensured that the optical marks are not obscured by individual robot links from the viewpoint of the camera systems.

There are furthermore solutions in which coordinate measurement arms having a plurality of links connected via rotary joints are attached to an industrial robot, quasi as a kinematic system that is connected in parallel, and moved jointly with the industrial robot. The coordinate measurement arms can have more accurate rotary encoders than industrial robots and measure for example a 3D pose of the robot more precisely. There is consequently a mechanical connection, and thus a mechanical constraint, between the robot and the coordinate measurement arm and, within itself, among the individual links of the coordinate measurement arm.

However, it is disadvantageous in this case that the freedom of movement of the robot be limited. More specifically, movements of the robot must always be limited such that a coordinate measurement arm that is coupled thereto does not tear off or is otherwise damaged. In particular, this can cause considerable problems when passing through singularities.

This solution is further not suitable for all manufacturing environments either, because the coordinate measurement arm and in particular the highly accurate rotary encoder thereof have only limited resistance against dirt and other environmental influences.

It is therefore an object of the invention to improve the accuracy of pose measurements with and/or in the case of kinematic systems that interact with an object.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The solution according to the invention is also directed in particular at industrial or manufacturing robots, but is not limited thereto. Other apparatuses and/or kinematic systems, the poses of which in particular with reference to a workpiece are to be determined, may also be provided. However, the apparatuses and/or kinematic systems preferably differ from the construction of conventional coordinate measuring machines and are furthermore preferably designed for manufacturing tasks.

In general, the term positioning apparatus will be used below, which can have a plurality of kinematic links that are movable relative to one another. For example, a tool for processing a workpiece or a measuring sensor (in particular a coordinate measuring sensor) can be mounted or mountable to the positioning apparatus. The spatial pose and/or pose relative to a workpiece of such a mounted unit can be determined in each case with the solution according to the invention. Generally, a complete spatial pose with respect to all six spatial degrees of freedom can be determined in this case, but it is also possible to determine merely individual spatial degrees of freedom.

As a first concept according to the invention it was found that one reason for the insufficient measurement accuracy of previous kinematic systems and of the rotary encoders they may include is that the influence of deformations or temperature expansions is not sufficiently capturable by sensing. A cause that has been identified is in particular that the abovementioned falsifying influences can affect degrees of freedom that are not capturable with sufficient accuracy using the rotary encoders. Consequently, the rotary encoder measurement values suggest a spatial pose that nevertheless deviates from the reality due to the degrees of freedom that are not captured, for example because lateral offsets between robot links that are coupled to one another are not included in a measured angular position.

The invention therefore generally makes provision for a novel measuring system to be provided in addition to or as an alternative to any rotary encoders. The invention is preferably configured not to measure merely individual rotational poses (or angular positions) between adjacent kinematic links, but also to ascertain measurement values (referred to here as pose measurement values) with respect to other degrees of freedom. These are preferably relative pose values of the connected kinematic links and/or of measuring links or components of measuring arrangements, which will be explained below, relative to one another. The proposed measuring system is furthermore also characterized by an increased freedom from mechanical constraint.

This measuring system can be used to capture by sensing the influence of, for example, deformations and/or temperature expansions at least with respect to these further degrees of freedom, and that influence can be included in a finally ascertained pose value. More specifically, it is possible based thereon to realize a pose determination of a reference point (here also synonymously referred to as a reference location) of the positioning apparatus (for example of the TCP) that is close to reality, and the measurement accuracy is generally improved.

For this purpose, the invention proposes to provide at least one measuring link in addition to the kinematic links that may be connected to one another via rotary joints in a manner known per se but also via linear joints, and whose relative positions can optionally also be captured by means of rotary encoders or linear sensors known per se (for example glass scales). This measuring link is attached to one of the kinematic links and is movable jointly therewith for example by way of a drive of the rotary joint.

However, pose measurement values are not captured like before using only the kinematic links and/or using rotary encoders that are coupled thereto, but the measuring link and/or a measurement device connected thereto can be captured by sensing or measured for acquiring pose values. Alternatively, a sensor for capturing a measurement device that is at least indirectly coupled for example to an adjacent kinematic link can be arranged as a measuring link. This makes it possible to provide a measuring arrangement that is configured preferably independently of a joint and of any sensors or rotary encoders (for example standard encoders) located there. This measuring arrangement can preferably also be used to ascertain pose values that are independent of the provided degree of freedom of the joint. These pose values can be incorporated, for example by addition, in the calculation of a final target pose value, that is to say they cannot be merely eliminated by compensation or the like computationally, but are incorporated directly in the final measurement result for example as a value portion or coordinate portion that is to be added fully.

A measuring arrangement is here understood to mean measurement devices and sensors (explained below) that can cooperate with one another in order to ascertain pose values. Optionally, the measuring links that are connected to these units can also be understood to be a constituent part of the measuring arrangement. For a multi-link positioning apparatus having a plurality of joints, a plurality of measuring arrangements can also be provided (preferably one per joint). The entirety of the measuring arrangements can form a measuring system of the positioning apparatus. Typical rotary encoders of a rotary joint or generally sensors for capturing measurement values with respect to the provided degree of freedom of the joint can be excluded from this measuring system. The measuring system can be provided, as it were, parallel to, but preferably mechanically at least partially decoupled from, the kinematic system of the positioning apparatus, which entails the advantages listed below.

Preferably, pose values for the degree of freedom of the joint and for example for the rotational degree of freedom of each rotary joint are also ascertained with the measuring system. This makes it possible that the joints themselves can be designed with less precision, in other words the requirements relating to their guide accuracy are reduced. Rather, possible guide inaccuracies (in particular of a radial nature) can be accepted because they are capturable by sensing and can thus be taken into account in a pose ascertainment. For example, such inaccuracies can be captured by sensing as a radial offset, which is added as a coordinate portion for example to an absolute (reference) pose value (explained below) during the ascertainment of a final pose value.

The invention further proposes to couple the measuring link to the assigned kinematic link and more specifically to attach it thereto, but in a region remote from the joint. In this way, deformations and in particular bending of the kinematic link can be captured comprehensively along a large length thereof, for example compared to an attachment of the measuring link near the joint. In the latter case, in particular bending of the kinematic link in regions remote from the joint would then be transferable to the measuring link only inadequately and thus not reliably capturable by sensing.

In particular, a chain of kinematic links can be formed, for example of the type of a chain consisting of the individual links (or arm links) of an industrial robot. Adjacent links can in each case be connected via a joint. A chain of measuring links can be formed similar thereto, but they are preferably not connected mechanically to one another, but are assigned in each case to a kinematic link and/or are attached thereto. The position of the measuring links relative to one another can also be determined for degrees of freedom that are independent of the degree of freedom of individual joints (realized or intended kinematically/mechanically) in order to ascertain values for selected further degrees of freedom of the positioning apparatus and/or of components mounted thereto.

In this way, the measuring links are mechanically decoupled from one another. Furthermore, a measuring link is preferably also always attached to only a single kinematic link and is jointly movable therewith. As a result, fewer components act directly mechanically on a single measuring link and the measuring links are in each case subjected to fewer mechanical constraints than if a complete coordinate measurement arm were to be moved jointly with the apparatus. This reduces movement limitations for the positioning apparatus and decreases the risks of damage within the measuring system.

In summary, the solution proposed thus makes a specific freedom from constraints possible or, in other words, limited mechanical force transfer between the kinematic system of the positioning apparatus to constituent parts of the measuring system and also among constituent parts of the measuring system. Preferably no mechanical coupling of the measuring system constituent parts in relation to one another exists in particular at the location of the measurement. The measuring system or the constituent parts thereof there can therefore be referred to as being completely free of constraints.

The measuring system that is proposed here and that can have a comparatively compact design and/or requires no mechanically connected multi-link kinematic system made of measuring links, further makes it possible to arrange the measuring system at least partially within the positioning apparatus. This increases the robustness because the measuring system can thus be reliably shielded from environmental influences.

In particular, embodiments of the invention make provision for shielding measuring arrangements used for the pose determination (in particular with sensors and/or measurement devices explained below) with respect to the environment. In other words, these can be arranged internally in the positioning apparatus, for example by being held in cavities located therein. This increases the reliability and also makes it possible to use the solution proposed here for example in very dirty manufacturing environments.

In particular, a positioning apparatus with a pose measurement function is proposed, wherein the pose measurement function makes possible the measurement of at least selected spatial coordinates of the positioning apparatus and for example of a reference point thereof (for example of the TCP or a mechanical interface for coupling sensors or tools). Alternatively or additionally, the pose measurement function can make possible the measurement of at least selected spatial coordinate values of an object to be measured (for example of a workpiece), relative to which the positioning apparatus moves.

The positioning apparatus has a first (preferably rigid) kinematic link having an optional measuring link and at least one second kinematic link to which a first measuring link is assigned and, more specifically, to which the first measuring link is attached (and is thus coupled to the second kinematic link preferably for joint movement), wherein the first and second kinematic links are connected to one another via a joint;

wherein one of at least one measurement device (or, in other words, a material measure) and at least one sensor (measuring sensor) for capturing the measurement device and/or signals transmitted thereby (for example optical signals and/or electromagnetic radiation) is arranged at the first measuring link and the corresponding other one of the measurement device and sensor is arranged at least indirectly at the first kinematic link, wherein, in addition to a relative pose value (that is to say for example an angular position about a substantially parallel rotational axis) corresponding to the degree of freedom of the joint, at least one further relative pose value (in particular of the positioning apparatus or within the kinematic system thereof and with particular preference of the kinematic links with respect to one another) is ascertainable for a different degree of freedom (in particular for a translational degree of freedom if the joint is a rotary joint or a rotational degree of freedom in the case of a linear joint) based on the capturing by sensing (that is to say capturing of the measurement device by way of or using the sensor and, more specifically, based on sensory measurement signals or measurement values generated in the process); and wherein an attachment location of the first measuring link at the second kinematic link lies closer to an end of the second kinematic link that is remote from the joint (and/or facing away therefrom) than to the joint.

The indirect arrangement at the first kinematic link can comprise attaching to the first kinematic link a purely optional (for example zeroth) measuring link as a further measuring link, at which the corresponding other one of the measurement device and sensor is arranged. Alternatively, it is possible for direct arrangement and in particular attachment at the first kinematic link to take place, in particular without a further measuring link at that location.

In particular, the attachment location of the first measuring link (for example viewed along a longitudinal axis) is spaced apart from the joint by more than half the length of the kinematic link. The length can correspond to the largest spatial dimension of the kinematic link.

The positioning apparatus can furthermore have drive units, in particular electric motors. A corresponding drive unit can be assigned to each joint to move the kinematic links relative to one another. More specifically, the kinematic links can be pivoted or displaced relative to one another by the drive unit in line with the degree of freedom of the joint and can also be held in the assumed positions.

Each rotary joint and/or each drive unit can comprise a rotary encoder for determining the relative angular position of the kinematic links and/or the angular position of the rotation joint. Each linear joint and/or each drive unit can comprise a linear sensor (for example having a scale) to determine the relative translational position of the kinematic links and/or the translational position or the displacement degree of the joint. Generally, each joint or each associated drive unit can thus have a sensor for capturing movements with respect to the degree of freedom of the joint.

Any kinematic links mentioned here and measuring links can be formed from one part or more parts. The term "link" relates in particular to an arrangement within a group, chain and/or sequence of corresponding kinematic links and also a possible plurality of measuring links. In particular, these can be arranged to be spatially successive, that is to say form individual links in this sequence.

As mentioned above, the first kinematic link can also comprise a measuring link. The latter will be referred to below merely by way of example as the zeroth measuring link. However, the first kinematic link can generally be spatially fixed and/or form a base relative to which the first measuring link is rotatable. This opens up particular design leeways for sensors or measurement devices that are positioned there and do not have to be held by a measuring link through constraint and/or generally be spatially or structurally combined. Consequently, a separate zeroth measuring link or generally a measuring link at the first kinematic link is purely optional.

If more than two kinematic links are provided that preferably form a kinematic chain and in particular an open kinematic chain, what was stated previously for the zeroth measuring link may be true for a measuring link that is assigned to the front-most kinematic link (that is to say the kinematic link that is arranged remote from the base, the last kinematic link and/or the kinematic link forming the open end). That is to say, this measuring link can likewise be omitted, because no separate measuring link is necessary there for example for holding a measurement device or a sensor.

At least the kinematic links that are connected on both ends to joints or to further kinematic links preferably have measuring links. For illustrative purposes, the following text makes reference to a plurality of measuring links, because this corresponds to a preferred embodiment, although the corresponding features and explanations can also apply to variants having only one measuring link (the first measuring link). Statements made herein relating to a plurality of measuring links can always apply to all measuring links of a positioning apparatus, and at least to those of kinematic links that are connected on both ends thereof to joints and/or adjacent kinematic links. A zeroth measuring link that may be present or front-most measuring link can therefore represent exceptions.

At least the second kinematic link and preferably also at least one further kinematic link, for example if at least three kinematic links are provided, can have an elongate design. This can be understood to mean that a corresponding kinematic link has a distinct longitudinal extent along a longitudinal axis. The longitudinal extent (in other words the length) can be the greatest spatial dimension, for example compared to cross-sectional dimensions along the longitudinal axis.

The kinematic links can be at least partially hollow, as will be explained below. They can be designed as typical arm sections of an industrial robot. They can comprise data lines and/or energy or working fluid supply lines, in particular in their interiors. Alternatively, such lines can also be mounted to the kinematic links from the outside.

A kinematic link can have a first and a second end. These can face away from one another (that is to say be located opposite one another) and/or be remote from one another. They can be connected by the longitudinal axis of a kinematic link and thus form end regions of the kinematic link that face away from one another. At one respective end of a kinematic link, a joint can be provided and/or generally a connection to an adjacent joint and/or kinematic link can be realized.

The joint can have at least one translational and/or at least one rotational degree of freedom. It may be a linear joint or rotary joint or be a combination thereof. The joint (which is in particular free of deformation and/or is not influenced by temperature) can, beyond at least one preferably mechanically and/or structurally fixed degree of freedom, have no other degrees of freedom or allow relative movements. Such relative movements, however, may still occur as a result of deformations, but this is preferably capturable by the measuring system. For structural reasons, however, only a defined number of (preferably only one or at least no more than two) (macroscopic) degrees of freedom of relative movement for the joint may be provided or intended.

If the measuring system also measures the degree of freedom of the joint, a rough measurement with a greater capturing region covering in particular the entire joint movement preferably takes place additionally. The respectively acquired rough and fine or high-resolution measurement values can then be combined to form a total measurement value.

Beyond the attachment location, the measuring links can preferably not be supported on the kinematic links. In other words, the attachment location can be the only attachment location, certainly at least the attachment location or support location that is closest from the viewpoint of the joint, on the and/or within the kinematic link(s). In other words, the measuring links can extend freely and/or in a suspended fashion at least over a majority of the lengths thereof in the or through the respectively assigned kinematic links.

Provision is preferably made in the case of a kinematic link that is connected on both ends to joints for the purposes of connecting to a respectively adjacent kinematic link for the preferably single attachment location of the measuring link to be selected such that it is located at a distance from one of the joints in the previously defined manner. However, this can also have the result that the attachment location is positioned near a joint at the correspondingly other (second) end. However, this means that only one attachment location that is also located at a clear distance from at least one of the joints is present within the kinematic link. In particular, bending can therefore be capturable along a majority of the length of a kinematic link and be transferred, as it were, to a joint that is located at a clear distance from the attachment location and in particular a sensor located there and/or a measurement device that is located there.

However, provision is preferably made for the attachment locations of measuring links of two adjacent kinematic links not to be chosen such that they are located in each case near a joint that connects these links. In other words, a joint is preferably not directly surrounded or enclosed by corresponding attachment locations. Rather, there is preferably a distance at least from one of the attachment locations of more than half the kinematic link having the location. This prevents relative displacements of the kinematic links from no longer being sufficiently transferable to the measuring links and/or no longer being sufficiently accurately capturable by the sensor and measurement devices typically arranged in the region of the joint.

For the second kinematic link, if it is connected to a further (third) kinematic link by yet a further joint, the following may apply: The second kinematic link can have, in the region of its end facing away from the (first) joint and/or first kinematic link, a measurement device or sensor, which are held for example at the measuring link of the kinematic link. The sensor or the measurement device can be positioned close to or in the region of the further joint and can project into the region, for example. The third kinematic link, by contrast, can have a (second) measuring link that has the corresponding other one of the measurement device or sensor so as to cooperate with the measurement device or the sensor of the second kinematic link. The second measuring link is preferably connected to the third kinematic link at an attachment location that is correspondingly remote from the second joint.

Any relative pose value mentioned herein can be a relative pose value of the measurement device and (or from) the sensor and/or of those components that have the measurement device and the sensor (typically any adjacent measuring links or a measuring link and an adjacent kinematic link). In particular, the relative pose value can describe the relative pose (in particular with respect to a defined spatial degree of freedom) between sensors and/or measurement devices that are located opposite to one another, between adjacent measuring links, and/or between adjacent kinematic links.

The relative pose value can be defined in a predetermined reference coordinate system. This can be, for example, a machine coordinate system and/or a base coordinate system. However, a coordinate system that is bound to a kinematic link and/or measuring link is also possible in principle.

In particular, the relative pose value can be one of six spatial relative pose values or relate to corresponding 6 spatial degrees of freedom (three translational ones and three rotational ones), as can typically be defined in a spatial coordinate system.

Provision may also be made for a plurality of sensors and/or measurement devices (in particular per joint) to be present, in particular for determining a plurality of relative pose values. These can cooperate, for example, in pairs. In addition or alternatively, a measurement device can be captured by a plurality of sensors, which are positioned differently with respect to one another so as to ascertain different relative pose values (that is to say are also positioned differently relative to the measurement device). For example, the sensors can surround the measurement device on different sides or lie opposite different sides of the measurement device.

As will be explained below, it is also possible for a relative pose value and in particular a rotational relative pose value to be ascertained by comparing the measurement values of different sensors. For example, a difference of the respectively captured measurement values can be formed and a rotational relative pose can be ascertained based on the difference.

The sensors can be light sensitive and/or be based on optical measurement principles. The measurement device can generate optically capturable signals (for example electromagnetic radiation and in particular light in the visible wavelength range), for example by means of at least one light source, preferably a laser source. Such signals can be captured by the sensor, for example in the form of an intensity value and in particular as a pixel value. In this way, intensity distributions (in particular pixel value distributions) in a sensor plane can be ascertained. Based thereon, relative offsets in the sensor plane (that is to say lateral offsets) between the sensor and the measurement device can be ascertained.

The radiation sources can be directly integrated in the measurement device. Alternatively, they can be positioned outside it and guide the radiation for example using a light guide to the measurement devices.

In particular, the measurement device can be configured to emit structured light. The light can be structured with respect to its spatial and/or temporal properties. This may be a light pattern, in particular a spatially and/or directionally dependent structured lighting pattern, and/or a temporal succession of light patterns. Structured light can be understood to mean that the relative pose between the capturing unit (that is to say the sensor) and the emitting unit (that is to say the measurement device) can be determined uniquely by capturing a specific solid angle into which the light is radiated and/or by capturing at least one light beam (or a set of light beams). This can presuppose knowledge relating to a relative arrangement of the sensor and measurement device and/or of an angle of incidence of the light. Such properties, however, can be easily identifiable and/or settable based on the spatial arrangement of sensors and measurement device.

Alternatively or additionally, the measurement device can comprise optically capturable marks (also referred to as targets). In this case, a sensor can preferably operate on an imaging basis and/or perform image capturing of the marks. Using image evaluation algorithms that are known per se, it is possible to ascertain searched-for relative pose values for example on the basis of an orientation ascertained in the captured image files and/or distortion of the marks.

It is also possible in principle to perform distance measurements by means of the sensors and, based thereon, to ascertain at least one relative pose value. For this purpose, for example inductive, capacitive or optical measurement principles can be used.

According to a further variant, the measurement device has optically capturable structures (capturing structure), for example a preferably three-dimensional topography. The sensor can be configured to capture the structures or at least selected properties and/or dimensions thereof (for example a height value distribution). For this purpose, the sensor can be, for example, a laser line sensor or generally be configured for measuring using optical patterns (in particular "optical fringe patterns") and can preferably also project the patterns onto the topography itself.

Alternative capturing of such topographies can be performed by means of triangulation sensors or white light sensors.

In a development, the measurement device can emit electromagnetic radiation in particular in the form of light, wherein the radiation is preferably incident on optically scattering, reflective and/or diffractive or beam-splitting elements. Next, the radiation (for example in the correspondingly optically scattered state) can be capturable by at least one sensor. In general terms, it is thus possible by irradiating objects and/or structures by way of the measurement device for a light distribution to be produced that is capturable by at least one sensor. Depending on the portion (or section) of the light distribution that is captured, it is then possible to conclude a relative pose of the sensor and measurement device.

All the measurement principles mentioned herein for ascertaining relative pose values can be based on relationships of measurement values of the sensors (for example captured light distributions and/or pixel value distributions in a sensor plane) and relative poses between the sensor and the measurement device being determined for example during a calibration operation and/or during a construction phase. The relationships can be stored in a controller and/or form a calibration table. During later operation (in particular measurement operation) of the positioning apparatus, searched-for relative pose values can be ascertained based on the previously stored information. For example, it is possible, depending on a sensor measurement value obtained, to search for the corresponding entry (that is to say matching measurement value) in the stored information (in particular in the aforementioned calibration table), and to read the relative pose value that is assigned to the entry. This can be performed individually for each degree of freedom under consideration.

It is thus not absolutely necessary to be able to mathematically uniquely calculate the searched-for relative pose values using the sensors or the measurement values thereof. Rather, it may suffice to be able to perform unique assignments to searched-for relative pose values based on the ascertained measurement values. This can be achieved by way of correspondingly spatially resolved optically capturable properties of the measurement device and in particular by way of signals or light patterns emitted/generated thereby.

The assignment explained should be performed uniquely at least in a predetermined value range (of the sensor measurement values). As will still be explained in more detail herein, initially a potentially relevant measurement value range of the sensors can be ascertained for example by means of a rough measurement by way of a measuring arrangement that is preferably of a different type (for example by any rotary encoders of rotary joints). It is then advantageously possible to perform a unique assignment of the sensor measurement values to searched-for relative pose values within the measurement value range. Such an ability of being uniquely assigned merely in a range-specific manner reduces the requirements relating to the resolution and/or the measurement accuracy of the sensors and measurement devices used.

Cooperating measurement devices and sensors can here also be referred to as a measuring arrangement or be comprised by a measuring arrangement. A measuring arrangement can correspondingly have at least one measurement device and a sensor that is cooperating therewith. However, if relative pose values are to be determined for a plurality of degrees of freedom, the measuring arrangement can also comprise a plurality of sensors and/or a plurality of measurement devices.

The positioning device and in particular the measuring system thereof can also comprise a temperature sensor in order to compensate temperature influences on the measurement of relative pose values (for example on the spatial pose of the sensors and/or measurement devices that is correspondingly influenced thereby). The compensation can be realized for example based on a temperature-dependent calibration and/or compensation table for ascertained relative pose values. Similarly, at least one vibration sensor and/or deformation sensor can also be provided and sensor measurement values generated thereby can be used for the compensation of error influences.

The aforementioned sensors (for deformation, vibration and/or temperature) can measure in particular the at least one measuring link and/or cooperate therewith. In the case of a plurality of measuring links, in each case one corresponding sensor can be provided per measuring link. In this way, it is possible to compensate influences on the measuring link that, under certain circumstances, do not have the same effect on a kinematic link and/or do not originate therefrom and thus also do not have an effect on the target pose value that is to be determined.

According to one development, the sensor is configured for contactless capturing and in particular for optically capturing the measurement device and/or signals generated/emitted thereby. Examples thereof were mentioned above. In this way, mechanical power transmissions within the measuring system are limited and preferably completely avoided, which makes possible the above-mentioned freedom from constraint of the measuring system.

Analogous advantages are attainable with an embodiment in which the first measuring link and the first kinematic link (and/or a zeroth measuring link assigned thereto) are not in contact. Generally, measuring links of a kinematic link cannot be in contact with an adjacent kinematic link (that is to say connected via a joint to the specifically assigned kinematic link) or a measuring link that is assigned thereto. This promotes the mechanical decoupling of the measuring links with respect to one another and thus the freedom from constraint of the measuring system.

Instead, the measuring links can have end regions that in each case face the joint or project into the connecting regions mentioned and that end at a distance from an adjacent kinematic link and/or measuring link and/or sensors or measurement devices located there. The corresponding one of sensor and measurement device can then be positioned at this end region.

Alternatively or additionally, provision may be made for the first measuring link to be at least not directly connected to the joint. For example, a merely indirect connection may exist via the kinematic link. Due to the selection of the attachment location, this indirect connection is realized, however, preferably over a distance that corresponds to more than half the length of the kinematic link. Consequently, in particular deformations of the kinematic link can be captured by the measuring link and be advantageously incorporated in the ascertained pose values. This would be possible only to a very limited extent in the case of direct support of the measuring link on or direct connection with the joint According to one development, the first measuring link is at least partially received in a hollow body section of the assigned second kinematic link and/or preferably each measuring link is received at least partially in a hollow body section of a respectively assigned kinematic link. This makes the at least partial shielding of the received section from environmental influences (in particular humidity and dust) possible. The hollow body section preferably has a hollow cylindrical design and/or a closed surface. This may be an arm section of hollow design, as is typical in customary industrial robots.

In addition or alternatively, provision may be made for measuring arrangements mentioned herein and in particular cooperating sensors and measurement devices to be positioned in a corresponding hollow body section. Provision may in particular be made for a contiguous hollow body section to be formed from interconnected kinematic links including an interposed joint and, more specifically, from the respective hollow body sections thereof, which contiguous hollow body section then preferably contains the entire measuring arrangement (that is to say all the sensors and/or measurement devices that cooperate for ascertaining relative pose values with respect to the kinematic links and the joint).

According to the previous variants, it is thus possible for internal measuring sensors or an internal measuring system to be provided within the positioning device, which increases the utilization range also with respect to manufacturing environments having more difficult measurement conditions.

Provision may in particular be made for the sensor and the measurement device to be arranged to be located opposite one another in the region of the joint. This allows for a more compact size and makes reliable measurement of pose values possible.

Provision may further be made for an absolute pose value of at least one reference location of the positioning apparatus to be determined on the basis of at least one of the relative pose values. This may be the already mentioned TCP or, generally, an interface of the positioning device for a unit that is positionable thereby (for example for a tool or a measuring sensor). The relative pose value can be ascertained herefor and be stored. For example, it can be added as a summand to a known absolute pose (for example of an apparatus base).

It is advantageous in principle if at least one absolute reference pose value in the desired coordinate system is known. The relative pose values ascertained can refer to the reference pose value and/or define the relative pose based thereon. For example, an absolute pose value of the sensor or of the measurement device that is comprised by the first kinematic link can be defined as the reference pose value. An ascertained relative pose value that defines for example the position of the first measuring link relative to the corresponding unit of sensor and measurement device can be used, with knowledge of the absolute pose value, to ascertain an absolute pose value of the first measuring link (or correspondingly of a predetermined reference location there) (for example by adding to known absolute poses and/or reference pose values).

If, as is generally preferred, a kinematic chain with a plurality of joints and kinematic links connected thereby is provided, it is possible in this way, starting from the base and with knowledge of previously measured relative pose values, to ascertain an absolute pose value of a reference location for example of a respective kinematic link. In other words, it is possible, on the basis of the known absolute pose value of the base and the measured relative pose values, to determine for example an absolute pose value (in particular with knowledge of a spatial extent of the measuring link) for the subsequent joint and/or an end of the measuring link located there. The value can then be combined by calculation with the relative pose value that is measured there in order to determine the absolute pose value for yet a further following joint. Figuratively speaking, it is thus possible to use relative pose values that are measured from joint to joint to ascertain local absolute values and to in turn combine by calculation the local absolute values with relative pose values that are measured subsequently (along the kinematic chain). This principle will be explained further below with reference to the figures.

In summary, according to an embodiment, the positioning apparatus comprises at least yet one further (third) kinematic link with a second measuring link that is assigned to the kinematic link, wherein the third kinematic link is connected to the second kinematic link via a second joint, with the result that preferably the kinematic links (that is to say the first to the third kinematic link) form a kinematic chain. In this case, a relative pose value can also be ascertainable between the first and second measuring links, and the absolute pose value of the reference location can also be determined based on the ascertained relative pose value. In particular, this pose value can be determined based on all measured relative pose values between adjacent measuring links and/or kinematic links. The reference location can here be located outside the first to third kinematic links, for example at a further kinematic link that preferably does not immediately follow the third kinematic link.

Where a relative pose value between two measuring links is mentioned herein, this can refer to a relative pose value between a sensor and a measurement device, which are correspondingly connected to mutually adjacent measuring links.

According to a further aspect, the joint comprises a sensor (pose sensor) for capturing movements and/or a pose in respect of the degree of freedom of the joint. For example, a rotary joint can comprise a rotary encoder (for example a conventional encoder). A final pose value, which may be for example the absolute pose value of a desired reference location of the positioning apparatus and/or an end result of the pose measurement, can here be ascertainable based both on these sensor measurement values and on the relative pose values. In particular, a type of rough measurement can take place based on the sensor measurement values and a fine measurement can take place using the relative pose values. This concerns in particular measurements of relative pose values corresponding to the degree of freedom of the joint.

However, provision may be made for rough measurements to be performed for a plurality of, and in particular for all six, spatial degrees of freedom (in particular for degrees of freedom that deviate from the degree of freedom of the joint). Sensors or a rough measuring system can be provided for this purpose, which preferably has a sufficiently large uniqueness range to be able to measure roughly but uniquely over value ranges of the relative poses that are appropriately dimensioned. According to the small freedom of movement of the degrees of freedom that deviate from the degree of freedom of the joint, the value ranges to be provided for the non-joint-related degrees of freedom are, however, relatively small and the measuring system can be correspondingly simplified.

In principle, provision may be made for a measuring link, whose assigned kinematic link is connected at both ends to further kinematic links, to project into both connection regions of the adjacent kinematic links and/or to extend through the entire kinematic link. With respect to one of the joints with which a connection to one of the adjacent kinematic links is realized, the previously mentioned distance from the attachment location can then be present. Furthermore, the measuring link can have at both its ends a sensor or a measurement device in order to cooperate with the measuring links of adjacent kinematic links and/or sensors or measurement devices that are located there. In this case, the measuring link can extend on both sides from the attachment location into the corresponding connection regions, that is to say also beyond the attachment location to a further (closer) joint.

According to a further general aspect, provision may be made, for ascertaining relative pose values for a plurality of degrees of freedom, for at least one sensor and one measurement device to cooperate in pairs per degree of freedom. Provision may also be made here for these pairs to be distributed differently over adjacent measuring links and/or kinematic links. For example, a first measuring link can have the sensor of a first pair but also the measurement device of a second pair, and the adjacent further measuring link can have the measurement device of the first pair and the sensor of the second pair.

Adjacent kinematic links and measuring links is here generally understood to mean kinematic links and measuring links that directly (that is to say without any interposed further kinematic or measuring link) follow one another along a kinematic or measuring link chain.

As mentioned above, the measurement device can comprise at least one radiation source (for example a laser source, in particular a laser diode) for generating electromagnetic radiation as a signal of the measurement device. The sensor can be configured for capturing the radiation (or, more specifically, for capturing radiation portions that are incident thereon). Alternatively, the measurement device can be connected to a radiation source, for example by way of a light guide, and receive and emit radiation that is generated externally, as it were, by way of a light guide. The measurement device can thus comprise an exit region of the light guide or, generally, an exit region for the radiation for being incident on at least one sensor.

The sensor is preferably spatially resolving and/or light sensitive. For example, the sensor can have a matrix (that is to say an array) of light-sensitive pixels or detector elements (for example individual diodes) with which radiation intensity values can be measured in each case. For example, the sensor can comprise a photodiode array. According to one variant, the sensor comprises a SPAD (Single Photon Avalanche Diode) array. Alternatively, it may be a CCD or CMOS sensor.

As has likewise been mentioned, it is possible for a relative arrangement of the sensor and measurement device to be ascertainable on the basis of the sensor capturing, in particular in a sensor plane and/or in at least one direction parallel to the sensor plane. Lateral measurements can thus be performed, for example by ascertaining positions of captured optical marks, structured light components, or measured light distributions in the sensor plane.

For ascertaining pose values for the degree of freedom of the joint and/or for at least one translational degree of freedom, cooperating sensors and measurement devices are positioned preferably close to the joint and/or in the connection region. By contrast, for ascertaining pose values for a bending degree of freedom, in particular about an axis extending transversely to the longitudinal axis of the kinematic link and/or measuring link, the sensor or the measurement device can be arranged at a distance from the joint. In particular, the unit can be arranged closer to the attachment location than to the joint in which the corresponding other unit of sensor and measurement device is located.

In this way, bending-related relative offsets can be captured over as long a length or longitudinal extent as possible and thus the actual relative pose for example between two adjacent kinematic links can be determined more accurately.

In addition or alternatively, at least two sensors may be provided, which can measure or cooperate with for example merely one measurement device, and the relative pose value can be ascertained based on a comparison and in particular on a difference of the respective capturing results (for example intensity values or intensity distributions) of the sensors. This has proven advantageous in particular for a torsional degree of freedom, that is to say a bending deformation about a longitudinal axis of, for example, the measuring link.

The sensors or sensor planes whose results are to be compared with one another can be aligned parallel to one another. They can be located opposite a common or the same side of the measurement device or alternatively enclose the measurement device between them (that is to say be located opposite different sides, in particular sides of the measurement device that face away from one another). Provision may be made in principle that the sensors (for example except for an optional predetermined neutral position) capture different signals (for example different light pattern portions or structured light portions) from the measurement device, depending on the relative alignment of the measurement device and the sensors whose results should be compared with one another.

The positioning apparatus is preferably a robot, preferably an industrial robot. The robot can be configured in particular for an object measurement, for example by comprising a corresponding coordinate measuring sensor. The robot can be a multi-articulated robot, for example possibly having at least four or up to six joints and in particular rotary joints. A base of the robot can be fixed in place and form the first kinematic link.

A front-most kinematic link (i.e. having the greatest distance from the base) of the robot can comprise an interface for mounting tools and/or measuring sensors (for example of a coordinate measuring sensor, for example a stylus and/or an optical sensor, in particular an optical distance sensor). The further kinematic links between the first kinematic link and the front-most kinematic link can be arranged one next to the other in the form of a kinematic chain.

However, an object measurement can also be performed without a separate coordinate measuring sensor at the robot, for example if the dimensions of a tool that is placed in contact with an object are known. In this way, it is possible for example to also capture, parallel to an object processing process, the spatial pose of the object and/or of the tool relative thereto and possibly to check it continuously. This is accomplished with the solution according to the invention with a significantly increased accuracy in contrast to pose determinations purely on the basis of conventional robot rotary encoders.

Furthermore, preferably a plurality of sensors (and possibly also measurement devices) are provided, by means of which relative pose values with respect to all six spatial degrees of freedom (preferably per individual joint) are ascertainable. In other words, the measuring arrangement that is assigned to a respective joint or a pair of connected kinematic links can be configured to determine corresponding relative pose values in particular of the adjacent measuring links and/or kinematic links for all six spatial degrees of freedom. If such a comprehensive degree-of-freedom determination is done for all measuring arrangements and/or joints, the pose in particular with respect to all six dimensions of a desired reference location of the positioning apparatus can be determined with particular precision.

However, for reasons of outlay or costs, it is also possible to dispense with the determination of corresponding pose values for at least some spatial degrees of freedom. This may be the case, for example, if relative movements of the measuring links and/or of the kinematic links with respect to one another in or about specific degrees of freedom are negligible for construction or application reasons.

The invention also relates to a method for operating a positioning apparatus, wherein the positioning apparatus has a first kinematic link and at least one second kinematic link, to which a first measuring link is attached, wherein the first and second kinematic links are connected to one another via a joint;

wherein one of at least one measurement device (or, in other words, a material measure) and at least one sensor (measuring sensor) for capturing the measurement device and/or signals transmitted thereby (for example optical signals and/or electromagnetic radiation) is arranged at the first measuring link and the corresponding other one of the measurement device and sensor is arranged at least indirectly at the first kinematic link, wherein the first measuring link is attached to the second kinematic link, and an attachment location is located closer to an end of the second kinematic link that is remote from the joint than to the joint, wherein the method comprises:

ascertaining at least one relative pose value (in particular of the first and second kinematic links) based on the capturing by sensing.

The method can further comprise the following measures:

fixing, using the positioning device, a relative arrangement of the positioning device and/or a tool or measuring sensor attached thereto with respect to an object to be measured; and/or ascertaining a measurement value relating to the object, in particular an object coordinate value, taking into account the relative pose value. The relative pose value can here be incorporated completely as a coordinate value or a coordinate portion in the object coordinate value for example by way of addition.

The method can have all further measures, steps and features in order to provide all the effects, operating states and interactions described herein. In particular, the method can be performable with a positioning device according to any aspect described herein. Furthermore, all explanations and further configurations of features of the positioning device can also apply to the correspondingly worded method features or be provided therein.

Further areas of applicability of the present disclosure will become apparent from the detailed description, the claims, and the drawings. The detailed description and specific examples are intended for purposes of illustration only and are not intended to limit the scope of the disclosure.

DETAILED DESCRIPTION

Figure 1:
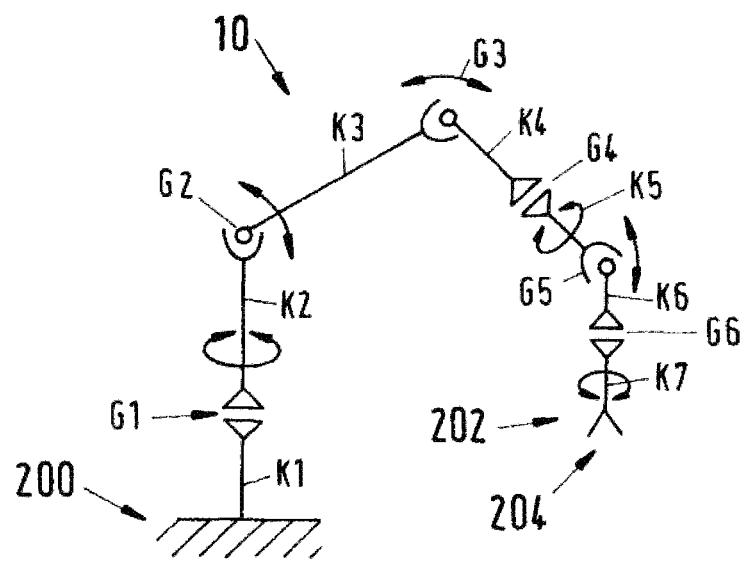
FIG. 1 is a schematic illustration of the kinematic system of a positioning apparatus according to an example embodiment.

FIG. 1 shows the kinematic system of an example positioning apparatus 10 as a schematic kinematic model. The positioning apparatus 10 is designed as a conventional six-joint articulated robot. Accordingly, the kinematic system shown corresponds to an open kinematic chain, which is fixedly connected to the ground at one end 200 and has a mechanical interface 204 for mounting a tool and/or measuring sensor at a second end 202 (forming an above-mentioned reference location or reference point) facing away from the end 200.

The first kinematic link K1 forms a basis of the chain. The kinematic link K7 having the interface 204 forms a front-most kinematic link of the chain. The interposed kinematic links K2-K6 are connected each at their two ends, which face away from one another, to a rotary joint G1-G6 and, via the latter, to a further kinematic link K1-K7 located there. In other words, they are positioned in each case between two further kinematic links K1-K7 and/or connected on both ends to adjacent kinematic links K1-K7.

At least some of the kinematic links K1-K7 have an elongate design, in particular at least individual ones of the kinematic links K2-K6 positioned between two further links. The longitudinal extent here corresponds to the straight-line shape shown of the kinematic links K1-K7. In particular, the longitudinal axes (not shown separately) of the kinematic links K1-K7 can coincide with the respective depicted straight lines of these links. However, the kinematic links K1-K7 are illustrated schematically in a strongly simplified manner. As is evident from FIG. 2, the kinematic links K1-K6 are in fact designed in the form of hollow cylinders.

It shows a sequence of kinematic links K1-K7, which are connected to one another via rotary joints G1-G6. The rotary joints G1-G6 make possible in each case the rotation about a defined axis of rotation, in other words have a defined rotational degree of freedom or rotary degree of freedom. The pose of the axes of rotation becomes clear from the selected symbols near the joints G1-G6 and the double-headed arrows depicted there.

More specifically, the joints G1, G4, G6, which are illustrated by means of two triangles located opposite to one another by way of their basic sides, have an axis of rotation extending in the sheet plane and parallel to the connected kinematic links K1-K7. The joints G2, G3, G5, which are illustrated as a combination of a sphere in a semi-spherical receptacle, have an axis of rotation that is perpendicular to the sheet plane.

What is not shown separately is that each of the joints G1-G6 has its own drive unit for performing the rotational movements about the corresponding axis of rotation.

Figure 2:
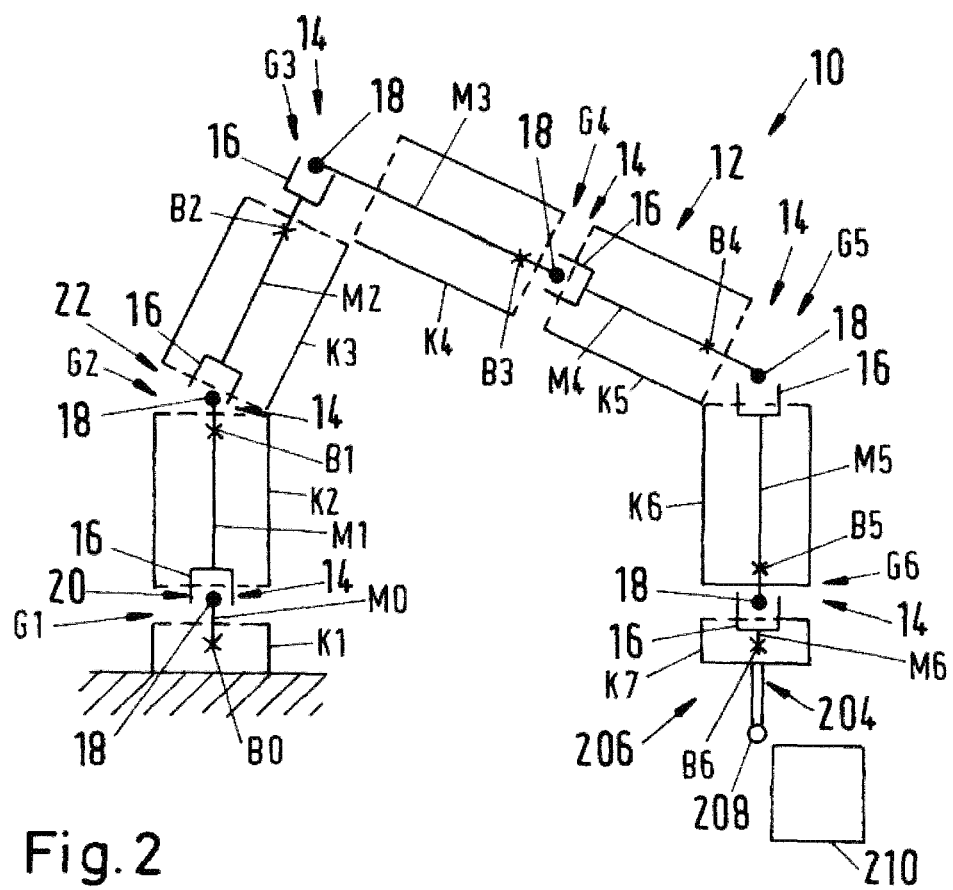
FIG. 2 is a schematic illustration of a measuring system having a plurality of measuring links, which is integrated in the positioning apparatus from FIG. 1.

FIG. 2 is primarily aimed at illustrating the positioning and extent of components of a measuring system 12 of the positioning apparatus 10 with respect to the basic kinematic system depicted in FIG. 1. The measuring system 12 comprises measuring arrangements 14, explained below, for each of the rotary joints G1-G6 including a plurality of measuring links M1-M6. What is not depicted separately are the constructive details of the rotary joints G1-G6, but these can correspond to conventional joints for industrial robots. As will also be shown with reference to FIG. 5, they comprise at least one roller bearing and preferably also in each case one rotary encoder. The region between two adjacent kinematic links K1-K7, in which the joints G1-G6 are arranged, corresponds in each case to a connection region into which the measuring arrangements 14, explained below, also at least partially project.

The measuring system 12 comprises per rotary joint G1-G6 in each case one measuring arrangement 14, consisting of at least one measuring sensor 16 (also merely referred to as sensor herein) and at least one measurement device (or material measure) 18. The fork-type illustration of the measuring sensors 16 is merely an example and selected in view of the following configurations of FIGS. 3-5. The measuring sensors 16 are preferably embodied to be flat or planar. They can be positioned for example by means of a corresponding fork-type holder in various ways relative to a measurement device 18 and in particular be grouped around the latter. A fork-type holder or a measuring arrangement 14 can also have a plurality of measuring sensors 16.

The measurement device 18 is likewise depicted merely schematically as a dot or sphere. A center of at least one radiation source of the measurement device 18 is indicated hereby. Proceeding from this radiation source, electromagnetic radiation and in particular light patterns can be radiated onto the measuring sensor(s) 16 of each measuring arrangement 14. This applies to the variants of the following FIGS. 3 to 4, whereas FIG. 5 shows a measurement device 18 in the form of an optically capturable 3D topography. Instead of arranging an arrangement directly in the measurement device 18, the radiation source could also be arranged outside of it (in particular outside of the positioning apparatus 10) and transmit the radiation to the measurement device 18 by way of a light guide.

Figure 3:
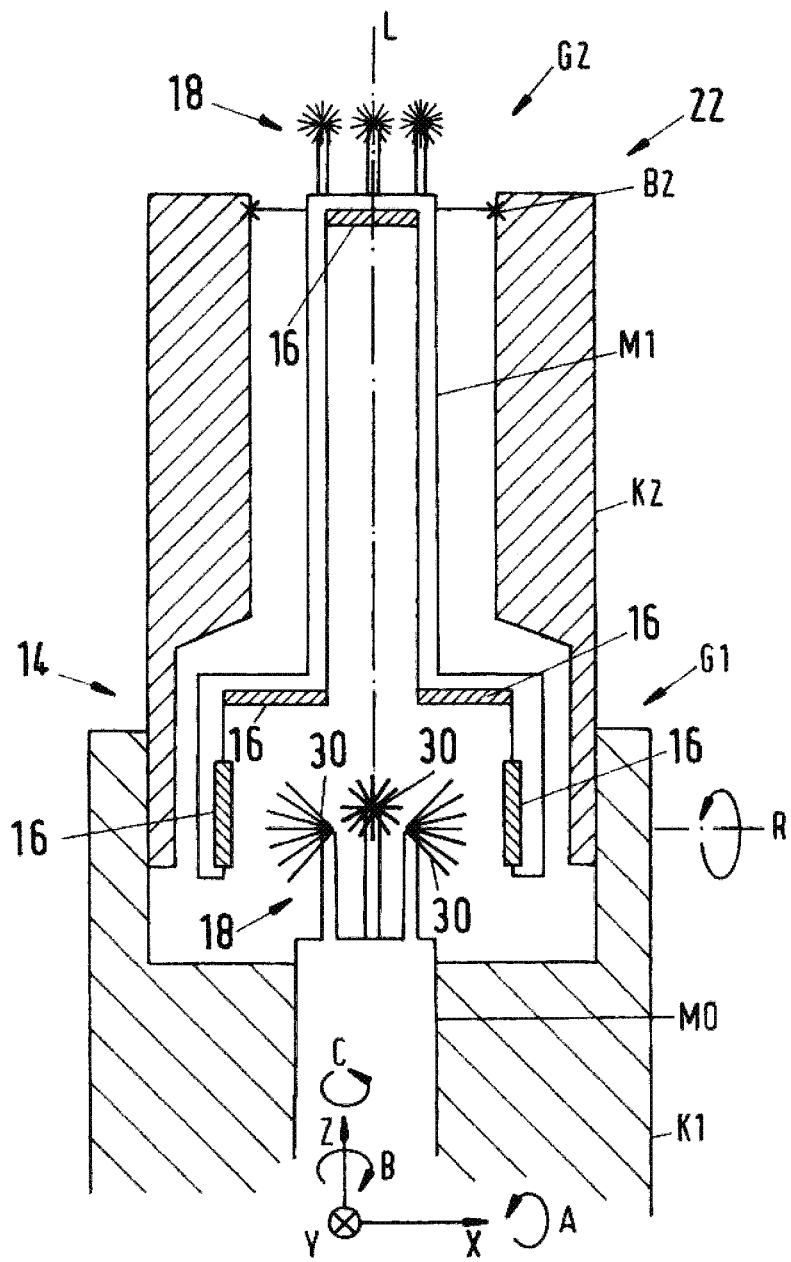
FIG. 3 is a schematic illustration of an example measuring arrangement, as can be used in the measuring system from FIG. 2.
Figure 4:
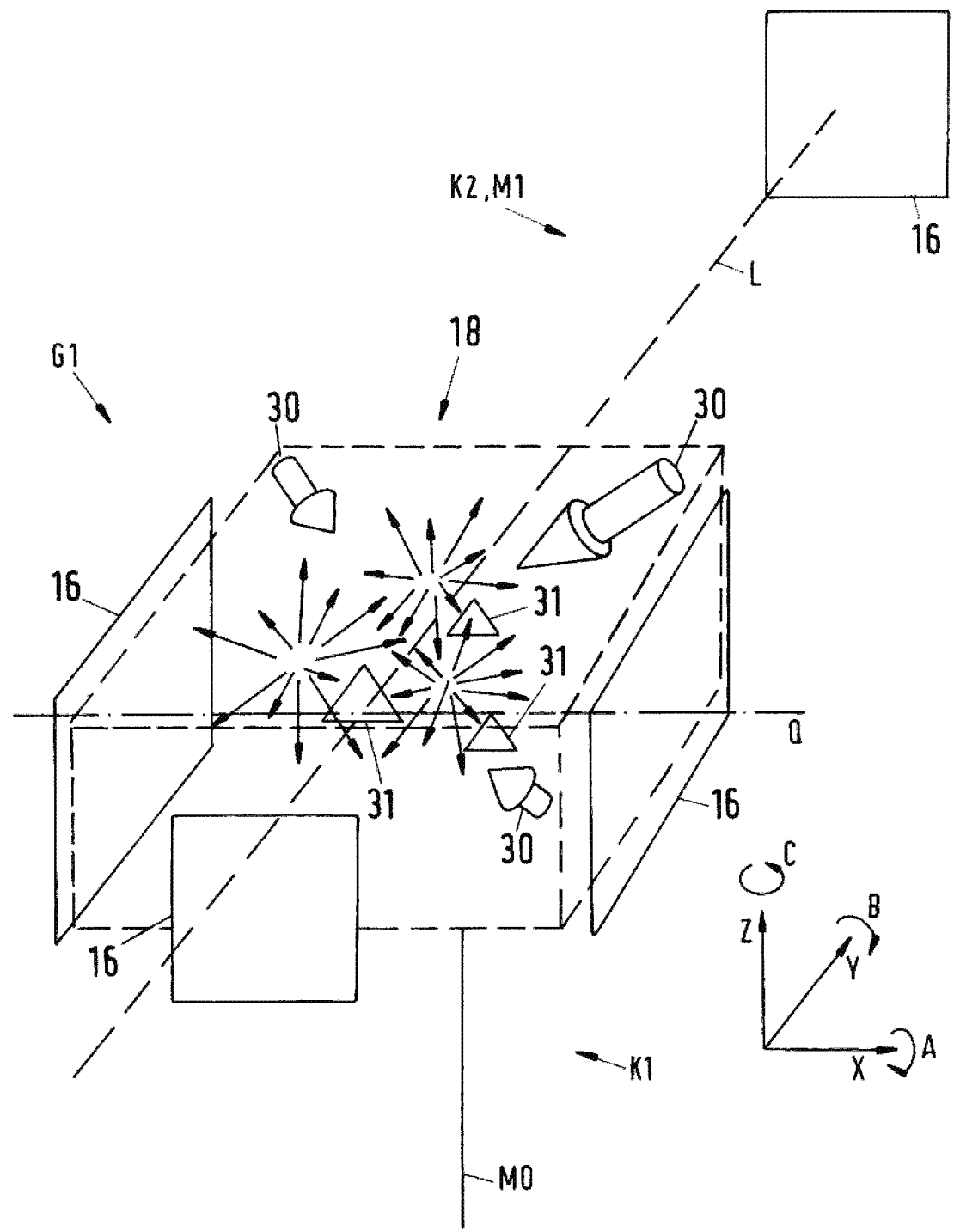
FIG. 4 is a schematic illustration of an alternative measuring arrangement, as can be used in the measuring system from FIG. 2.
Figure 5:
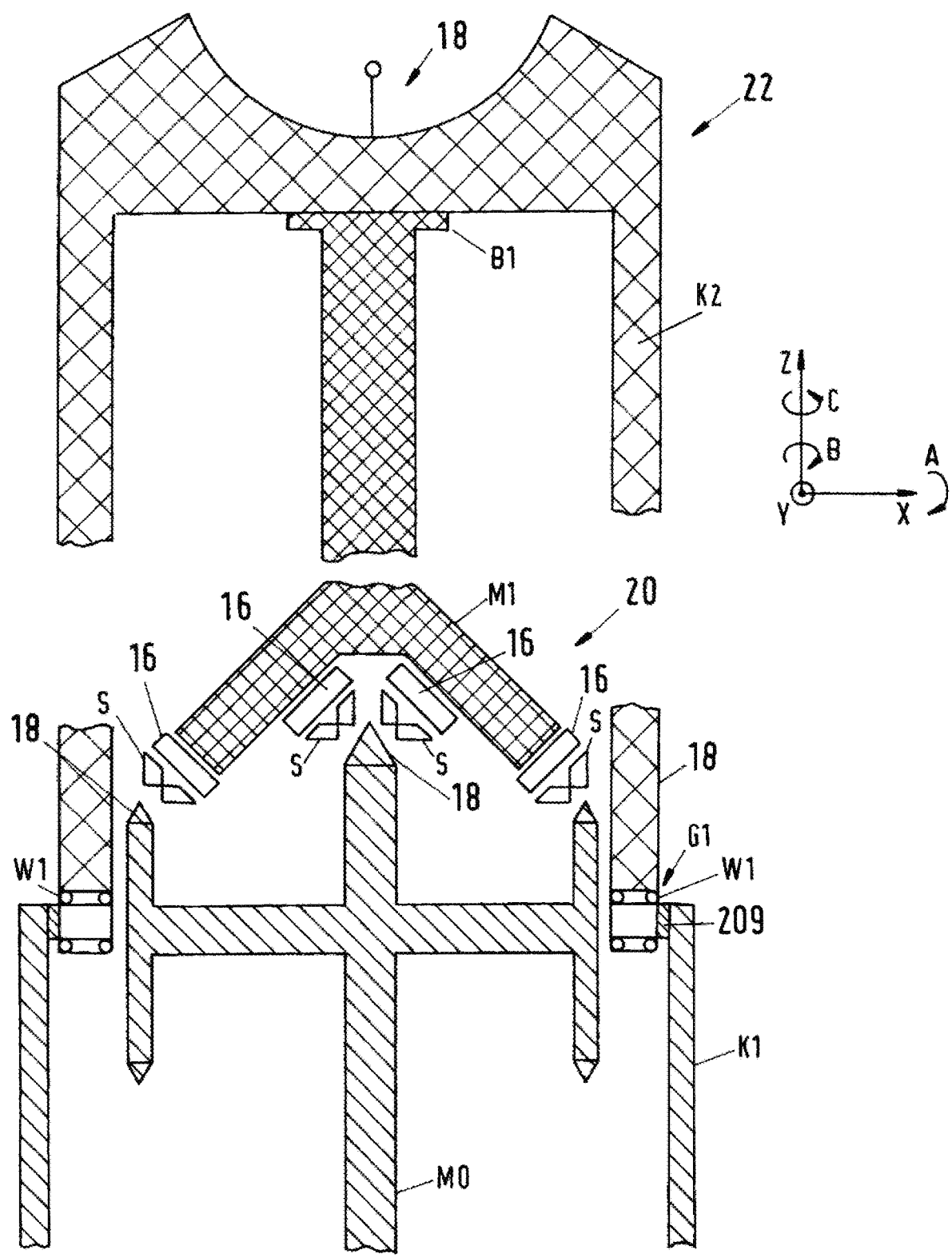
FIG. 5 is a schematic illustration of a further alternative measuring arrangement, as can be used in the measuring system from FIG. 2.

What is not shown separately but explained on the basis of FIGS. 3 and 4 nevertheless is that the measuring arrangements 14 can also have in each case at least one measuring sensor 16 that is positioned clearly outside of a rotary joint G1-G6 assigned to a measuring arrangement 14.

The measuring system 12 also comprises a sequence of measuring links M0-M6. Each measuring link M0-M6 is here assigned to one of the kinematic links K1-K7 and in particular attached thereto. The attachment locations B0-B6 are marked with a cross. As was explained in the general part of the description, the measuring link M0 of the first kinematic link K1 is merely optional, because the unit located there of the measuring arrangement 14 (and the measurement device 18 in the example shown) does not necessarily have to be positioned by a separate link or be held thereby. The reason is the increased stability of the first kinematic link K1, which forms a base with a limited longitudinal extent. The same is also true for the measuring link M6 in the front-most kinematic link K7.

The further measuring links M1-M5, which are assigned to the kinematic links K2-K6, which are connected on both ends to adjacent links, have an elongated design. The straight-line shape illustrated merely schematically extends along the longitudinal axis of the respective measuring links M1-M5. It can be seen that the latter thus extend through substantially the entire length of an assigned kinematic link K1-K6, but at least along more than half or more than three quarters of the length.

It is furthermore shown that all measuring links M0-M6 are received within a cylindrical hollow space of a respective kinematic link K1-K7, that is to say are positioned internally. The measuring arrangements 14 are also positioned internally, in particular because they are shielded from the environment by the joints G1-G6 (not shown) and/or by the opposing end regions of the adjacent kinematic links K1-K7.

In summary, the positioning apparatus 10 thus has internal measuring sensors or an internal measuring system 12 protected from environmental influences affecting the measuring accuracy owing to the external kinematic links K1-K7 and/or joint components.

It is furthermore shown that the measuring links M0-M6 are not in each case coupled to one another, and are certainly not in contact. Direct transmission of force between the measuring links M0-M6 and in particular between successive or adjacent measuring links M0-M6 is thus not possible.

The measuring links M1-M5, which are located opposite to other measuring links M0-M7 on both sides or which are arranged between two other measuring links M0-M7, in the example shown each have two end regions 20, 22 facing away from one another. These are connected to one another by an elongate rod-shaped section. A respective attachment location B0-B6 is located between the end regions 20, 22. In the example embodiment shown, at least the measuring links M1-M5 consequently extend on both sides beyond their respective attachment locations B1-B5. The attachment can take place for example by means of a screwed-in clip or bracket, which holds and fixes the rod-shaped measuring link M0-M6 at the respective attachment location B0-B6.

Reference is made below by way of example to the first measuring link M1, the end regions 20, 22 of which are marked separately in FIG. 2. The statements made in this respect also correspondingly apply to the further measuring links M2-M5, which are positioned at both ends between further measuring links M0-M6.

The first measuring link M1 has, at its first end region 20, at least one measuring sensor 16. The latter is a constituent part of the measuring arrangement 14 for capturing relative pose values between the first two kinematic links K1, K2. The first measuring link M1 has, at its second end region 22, a measurement device 18, which is a constituent part of the measuring arrangement 14 between the second and third kinematic links K2, K3.

It is not necessary that different units of the respective measuring arrangements 14 are arranged at the end regions 20, 22 of a measuring link M0-M6 (that is to say one measuring sensor 16 provided at one end and a measurement device 18 provided at the other). It is also possible that units of the same type are arranged there (see in FIG. 2 the measuring link M2 with two measuring sensors 16 and M3 with two measurement devices 18). This applies at least if different units located opposite one another in the region of the joints G1-G6 (at least one measuring sensor 16 and at least one measurement device 18) can cooperate.

Furthermore, it is also merely optional that the measuring links M0-M7 extend beyond their respective attachment locations B0-B6 up to the next (that is to say closest) joint G1-G6 and there hold one of a measurement device 18 and measuring sensor 16. For example, the measuring links M0-M7 could also terminate in each case at their attachment locations B0-B6 or at least not extend further to the next joint G1-G6. A measurement device 18 or the measuring sensor 16 located there can then be held by a separate holder.

However, it is advantageous for the solution shown if there exists, per joint G1-G6, one measuring link M0-M7 which extends to the joint and whose attachment location B0-B6 is located at a distance from the joint G1-G6, in particular by more than half the length of the measuring link M0-M7 and/or of a kinematic link K1-K7 assigned thereto.

In summary, the attachment locations B0-B6 are positioned as a particularly preferred feature such that a joint G1-G6 has in each case only one attachment location B0-B6 in its vicinity (for example only one attachment location B0-B6 located at a distance of less than half the length of a respective kinematic link K1-K7, which is coupled by means of the joints G1-G6, from the corresponding joint G1-G6). By contrast, it is possible to extensively mechanically capture pose changes of the assigned kinematic link K1-K7 in the manner described by way of the measuring link M0-M6, which is attached at a corresponding distance and extends up to a joint G1-G6, and to incorporate them in a sensor-based measurement in the region of the joint G1-G6.

In the case of the illustrated open kinematic chain, two successive attachment locations B0-B6 are thus in each case located at a distance from one another of at least half, but preferably of at least two thirds or at least three quarters of the length of one of the kinematic links K1-K7 that has one of the attachment locations B0-B6.

With reference to the lower measuring arrangement 14 in FIG. 2 or the rotary joint G1 located there, the attachment location B1 is located near the end region 22 of the measuring link M1 that is remote from the rotary joint G1. This is equivalent to a positioning near an end (upper end in FIG. 2) of the second kinematic link K2, which faces away from the first kinematic link K1. In particular, the attachment location B1 is located at a clear distance from the rotary joint G1 and positioned closer to the end region 22 or the upper end of the kinematic link K2.

With reference to the relative position of the kinematic links K1 and K2 that is to be determined, this means that at least one of the measuring links M0, M1 (in this case the first measuring link M1) is positioned at a clear distance from that rotary joint G1 by means of which the kinematic links K1 and K2 are attached to one another.

As described, it is thus possible in particular for deformations of the second kinematic link K2 to be transferred over a majority of its length to the measuring link M1, with the result that the unit of measuring sensor 16 and measurement device 18, which unit is coupled thereto, is displaceable analogously to the kinematic link K2 and thus assumes a pose representing the real state of the second kinematic link K2. This can consequently result in a relative pose of the measurement device 18 and the measuring sensor 16 that is capturable by means of the measuring arrangement 14.

In knowledge of dimensions of the measuring links M0-M7, which may be assumed to be constant, and the relative positions thereof with respect to and within the respectively assigned kinematic links K1-K7, it is also possible to determine the relative pose of the correspondingly adjacent measuring links M0-M6 and/or kinematic links K1-K7 on the basis of the measured relative pose of the measurement device 18 and measuring sensor 16. As was explained in the general description part, it is also possible, however, for deviations of such dimensions, for example due to temperature expansions, to be captured by sensing and to be taken into account computationally when ascertaining the relative poses.

The measuring arrangements 14 are configured in each case to determine, as a relative pose value, a pose value (in this case the angular position) of the measuring sensor 16 and of the measurement device 18 about an axis parallel to the axis of rotation of an associated joint G1-G6 or about an axis that coincides with the axis of rotation. However, since it is not possible to rule out that the measuring links M0-M6 are slightly displaced with respect to an ideal, load-free pose due to forces acting thereon, the axes may extend at a slight angle (for example of less than 5° or less than 2°) with respect to one another. The relative pose value can therefore under certain circumstances relate to a rotary degree of freedom that does not exactly match that of the joint G1-G6 but corresponds to it with a reasonable approximation. This is referred to here as ascertaining a pose value for a degree of freedom corresponding to the rotational axis.

Such a deviation of the axis of rotation under consideration, however, does not have any decisive influence on the measuring accuracy with respect to a final coordinate ascertainment of, for example, the interface 204. It is more relevant herefor to precisely determine actual relative poses of the kinematic links K1-K7, which is accomplished according to the invention in particular by the arrangements of the attachment locations B0-B6. For ascertaining the relative poses, it is not necessary that the exact rotational axes of the rotary joints G1-G6 be measured and/or considered.

The measuring arrangements 14 are furthermore in each case configured to ascertain a corresponding pose value for at least one further degree of freedom of the relative movement of the measuring sensors 16 and measurement devices 18, which are located opposite one another, and/or the measuring links M0-M6 and/or kinematic links K1-K6. Preferably, and as has been explained in more detail with reference to the examples of FIGS. 3-5, corresponding relative pose values are ascertained for all six spatial degrees of freedom.

What is not shown separately is that the measuring arrangements 14 transmit their measurement results for example by means of a data line to a control device and/or a control computer of the positioning apparatus 10. The measurement results can be evaluated there in the manner described herein.

In particular, provision may be made for the absolute spatial coordinates of the interface 204 to be determined with the measuring system 12 as a superordinate objective of the pose measurement. The interface 204 consequently forms a predetermined reference point of the positioning apparatus 10, the spatial pose of which is to be determined.

A reference coordinate system that is selected for example is a spatially fixed coordinate system in which the spatial pose of the base (that is to say of the kinematic link K1) is known. Accordingly, the spatial pose of the measurement device 18 located there is also known (or is ascertainable if the relevant dimensions are known). The measurement device 18 or the absolute pose thereof forms a reference or a reference point, starting from which the spatial pose of the interface 204 is determinable taking into account the measured relative poses.

More specifically, the relative pose of the measuring sensor 16 (and consequently of the measuring link M1 and/or kinematic link K2) with respect to the measurement device 18 (or the measuring link M0 and/or kinematic link K1) is determined with the first or lowest measuring arrangement 14 in FIG. 2. This is done in the case shown for each spatial degree of freedom.

If, per degree of freedom, the relative pose value that is measured herefor is added to the known absolute pose value for the degree of freedom, or if relevant relative distances or other known geometric dimensions are added, it is possible to determine an absolute pose value for a further reference point (in particular along the measuring link 18). In other words, the absolute pose of the further reference point is calculated taking into account the relative pose that is captured by sensing, that is to say the explicitly measured and preferably buffered relative pose value is incorporated as a computational variable in the pose value, in particular by way of addition. In the present case, the absolute pose of the measurement device 18, which is attached to the second end region 22 of the measuring link M1, is ascertained in this way and for example with knowledge of the length of the first measuring link 18.

Since a relative pose of the measuring sensor 16 located there with respect to the measurement device 18 is then determinable again by means of the measuring arrangement 14 in the associated joint G2, it is possible in a similar manner to the one described above to determine the absolute pose of the measuring sensor 16 in the subsequent joint G3. This can be continued until the kinematic link K7 is reached. Here, in knowledge of the (fixed or constructively fixed) relative pose of the interface 204 with respect to the measuring sensor 16 located there, the absolute pose of the interface 204 can be ascertained. This is accomplished analogously to the above-mentioned ascertainment of the absolute pose of the measurement device 18 of the second kinematic link K2.

A measuring sensor in the form of a stylus 206, which is arranged at the interface 204 and has a probe sphere 208 at its tip, is furthermore indicated merely highly schematically. For known dimensions of this stylus 206, the coordinates of the probe sphere 208 can be ascertained. If the latter comes into contact with a schematically indicated object 210 (in particular an industrially manufactured workpiece), the coordinates of the surface location of the object 210 that is probed by contact can be determined analogously to conventional coordinate measuring machines.

Initially making reference to FIG. 3 below, a part of a measuring system 12 that can be used in the positioning apparatus 10 in FIG. 2 is shown in a schematic plan view. The measuring arrangement 14 between the first and second kinematic links K1, K2 and the first measuring link M1 are shown here by way of example.

The axis of rotation R of the joint G1, along which the kinematic links K1, K2 are connected to one another via a roller bearing (not illustrated separately) including associated connecting elements, is shown.

The first kinematic link K1 is spatially fixed. The second kinematic link K2 rotates relative thereto about the axis of rotation R, wherein the force of movement is again generated by means of a drive unit (not shown) of the joint G1. The internal measuring link M1 attached to the kinematic link K2 at the location B2 correspondingly rotates jointly with the kinematic link K2.

The measurement device 18 in the case shown is configured to generate (light) signals in the form of electromagnetic radiation. Three individual radiation sources 30, which radiate radiation into partially overlapping solid angles, are shown herefor merely by way of example. The radiation sources 30 preferably comprise in each case at least one laser diode.

Provision can likewise be made for the measurement device 18 to comprise only one radiation source 30 in the form of a projector. The latter can radiate radiation for example in the manner of a planetarium projector into a three-dimensional and, for example, conical solid angle region. The incoming radiation can have light patterns and in particular structured light according to any type that is explained herein.

In particular, the radiation source 30 can be a light source that can be viewed preferably from a multiplicity of and preferably every spatial direction(s) and/or emits radiation in a multiplicity of and preferably every spatial direction. A spatially and/or directionally structured emission preferably takes place here by way of the radiation source 30. The emission is preferably of a nature such that an at least partially unique identification of the captured section can also take place merely by means of section-wise viewing or capturing of the radiation. This can comprise establishing a reference of the section to the entire emission segment or volume. The radiation is thus preferably uniquely coded and/or resolved via its entire solid angle region (e.g. 4 pi in steradians). The radiation source 30 can comprise a diffractively or refractively emitting element and/or be of microoptical design. Alternatively, holographic approaches for structuring the emission from the radiation source 30 can be used.

The measuring sensors 16 are in each case light sensitive and spatially resolving. More specifically, they are sensitive for wavelength ranges of the electromagnetic radiation and can measure an incident radiation intensity. For this purpose, they each have a planar design and have a matrix or a grid of a multiplicity of individual detector pixels. The grid is preferably a SPAD array of the type explained in the general description part. The sensor planes (that is to say the plane in which the grid or the matrix extends) is here in all the cases shown perpendicular to the sheet plane. This corresponds to an alignment of the sensor planes perpendicular to a plane that contains a longitudinal axis L at least of the kinematic link K2 and the axis of rotation R.

The measuring sensors 16 are in each case configured to capture distributions of the incident radiation in the respective sensor plane. This can be evaluated by the control device (not illustrated) to determine a lateral offset between the measurement device 18 (and/or its at least one radiation source 30) with respect to the measuring sensors 16 for example with respect to a predefined relative neutral position of the units 16, 18. Relative pose values for all six spatial degrees of freedom can be ascertained therefrom in the manner described below.

The degrees of freedom result from the coordinate system of FIG. 3. The Z-axis here corresponds to a vertical spatial axis, which extends in particular along a longitudinal axis (not illustrated separately) of the first kinematic link K1. The axes X, Y define a horizontal spatial plane. The rotational degrees of freedom A, B, C illustrated in each case represent rotations about the assigned axes X, Y, Z.

Two measuring sensors 16, the sensor planes of which extend parallel to the longitudinal axis L and which are located opposite one another along the X-axis, are shown. More specifically, they hold the measurement device 18 between them, or are located opposite sides of the measurement device 18 that face away from one another. With further preference, they are intersected by the axis of rotation R, and specifically advantageously intersected orthogonally (that is to say the axis of rotation R extends normally to the corresponding sensor planes).

Using the measurement values ascertained with these measuring sensors 16 and, more specifically, the respectively captured intensity distributions, it is possible for example by means of a calibration table to measure respective relative offsets of the measuring link M1 with respect to the measurement device 18 in the Y- and Z-directions. It is also possible, in particular if the respectively opposite radiation sources 30 radiate light patterns of the same type and/or with suitable coding onto the mutually opposite measuring sensors 16, to determine the rotational pose about the Y-axis according to the rotational degree of freedom B on the basis of a comparison of the measurement values that are respectively captured with the measuring sensors 16.

Two measuring sensors 16, which are positioned in a common plane and on both sides of the longitudinal axis L and the sensor planes of which extend orthogonally to the longitudinal axis L and parallel to the X-axis and axis of rotation R, are furthermore shown. These measuring sensors 16 can be used to determine in each case a relative offset along the X-axis. It is furthermore possible to determine a relative oblique position and a torsion deformation about the Z-axis that causes it (that is to say a pose corresponding to the rotary degree of freedom C) from a comparison of the measurement values of the respective sensors 16.

For the still remaining rotary degree of freedom A, which is the essential bending degree of freedom of the measuring link M1, a measuring sensor 16 of the measuring arrangement 14, which is positioned closer to the attachment location B2 of the measuring link M1 than to the considered or measured rotary joint G1, is shown as an advantageous variant. A sensor plane of the measuring sensor 16 is perpendicular to the longitudinal axis L and preferably extends parallel to the axis of rotation R.

In a bending-free neutral position, the measuring sensor 16 is used to capture radiation that is radiated in the form of a defined intensity distribution by the in particular central radiation source 30 in the case shown. If, owing to a bending, the measuring link M1 rises or drops in its end region 22 that is correspondingly remote from the joint G1, the relative pose of the measuring sensor 16 positioned there also changes relative to the radiation source 30. Accordingly, this measuring sensor 16 will also capture another intensity distribution in its sensor plane.

Again it is possible, depending on the captured intensity distribution, to conclude the current relative pose of the measuring sensor 16 and the radiation source 30 with respect to the rotary degree of freedom A, preferably by means of a previously stored calibration table.

Based on the pose values ascertained for the individual degrees of freedom and in knowledge of the spatial extent of the measuring link M1 and the absolute pose of the measurement device 18 in the joint G1, it is then possible to automatically ascertain the absolute spatial pose for the end region 22 and any reference location defined there by way of the control device.

It is, for example, indicated that a measurement device 18, which projects into the following joint G2 or cooperates with opposite measuring sensors 16 of the measuring link M2 following thereafter, is furthermore arranged in the end region 22 (see FIG. 2). The absolute pose of this measurement device 18 can be determined on the basis of the ascertained absolute pose of the reference location. In particular, this measurement device 18 itself can form or contain the reference location.

For the kinematic links K1, K2, which are coupled to one another, the complete spatial relative pose with respect to all spatial degrees of freedom is determinable in this way, as compared to a conventional measurement of only one individual rotary degree of freedom purely by means of rotary encoders (in accordance with the axis of rotation R of the rotary joint G1). Since the relative pose values ascertained per degree of freedom are used by way of addition to ascertain absolute reference location pose values, the accuracy of the pose ascertainment of the reference location is significantly increased.

FIG. 4 shows an alternative measuring arrangement 14, which is illustrated in a highly simplified manner compared to FIG. 3. The measuring arrangement 14 can likewise be used for measuring the relative pose in particular of the kinematic links K1, K2 from FIG. 2. The measurement device 18, the extent of which is outlined in dashes, is arranged at a measuring link M0 extending along the, again, vertical spatial axis Z. The further kinematic link K2 and the measuring link M1, the longitudinal axis L of which is shown, extend at an angle with respect to the Z-axis. An axis of rotation R of the first rotary joint G1 (likewise not illustrated separately) extends along the Z-axis, with the result that the kinematic link K2 can at least partially receive the measurement device 18 yet can rotate about it. This substantially corresponds to the configuration of the first axis or of a first joint of a SCARA robot.

Individual radiation sources 30 or the directions of incidence thereof are indicated by means of arrows. The radiation emitted hereby (preferably light radiation and/or radiation in the optically visible range) is directed at optically scattering and/or reflective elements 31. The latter distribute the radiation in a spatially defined manner and direct it at the measuring sensors 16, which are again of planar design.

The measuring sensors 16 are again grouped around the measurement device 18 such that they can determine the relative pose of the measuring links M0, M1 with respect to all six spatial degrees of freedom. All of the measuring sensors 16 again ascertain lateral offsets relative to the measurement device 18 or the light patterns generated hereby or light distributions in accordance with any approaches mentioned herein.

By way of example, the degrees of freedom are ascertained as follows: Two of the measuring sensors 16 are aligned parallel to one another, are located opposite one another along an axis designated Q, and enclose the measurement device 18 between them. Lateral offsets in the Y- and Z-directions can be determined using the respectively captured intensity distributions. A rotation about the Z-axis can be determined from a comparison of the capturing results.

Using a further measuring sensor 16, which is positioned the furthest to the front along the longitudinal axis L and immediately opposite the viewer in FIG. 4, displacements along the X-axis can be captured.

The bending about the X-axis is again capturable with the measuring sensor 16, which is positioned along the longitudinal axis L and at a clear distance from the measurement device 18. The torsional degree of freedom (that is to say twisting about the Y-axis) can be determined from a comparison of the measurement values of both parallel measuring sensors 16 that are positioned along the longitudinal axis L and receive the measurement device 18 between them.

FIG. 5 shows yet a further embodiment. Again, a first and second kinematic link K1, K2 are shown here by way of example, which are arranged analogously to the variant from FIG. 2 within a positioning device 10 (which is otherwise not illustrated further). The kinematic links K1, K2 are in each case not depicted in their entirety. A central part in particular of the second kinematic link K2 has been omitted, so that only the end regions 20, 22 thereof are shown.

The kinematic links K1, K2 are in turn hollow and receive measuring links M0, M1. The measuring link M1 of the second kinematic link K2 is likewise illustrated with a hole (that is to say without the central part). The measuring link M1 is attached at an attachment location B1 to an inner end face of the kinematic link K2. Furthermore, a measurement device 18, which is attached to an inner side or end face of the kinematic link K2 facing away from the attachment location B 1, is indicated highly schematically.

The kinematic links K1, K2 are connected to one another via a rotary joint G1, such that the indicated axis of rotation R is obtained. Also shown by way of example are roller bearings W1, which rotatably support by way of example a journal of the first kinematic link K1. The position of an encoder 209, which is known per se, for measuring the rotation angle of the kinematic links K1, K2 is also shown.

The measuring links M0, M1 are not directly connected to, or mounted in, the rotary joint G1. As mentioned, the attachment location B1 of the first kinematic link K1 is instead again positioned at a distance from the joint G1 (in the remote end region 22). Similar is true for the zeroth measuring link M0, even if its attachment location is not depicted separately.

In the variant shown, for example the measuring sensors 16 for measuring a multi-part measurement device 18 (or a plurality of individual measurement devices 18), which are arranged at an opposite region of the zeroth measuring link M0, are positioned at the measuring link M1.

The measuring sensors 16 are optical sensors that are configured to capture height variations of the measurement device 18. For example, these may be optical distance sensors and in particular triangulation sensors. Therefore, schematically highly simplified beam profiles S, which depict a course of the laser radiation emitted by the measuring sensors 16 and the reflections thereof at an opposite measurement device 18, are also indicated. The measurement devices 18 preferably have three-dimensional optically capturable topographies.

Merely by way of example, two of the measuring sensors 16 along the X-axis are positioned externally (that is to say near the respective internal walls of the surrounding kinematic links K1, K2) and are located there in each case opposite a measurement device 18. Between them along the X-axis, two measuring sensors 16 are located, which irradiate different external sides of a measurement device 18 that is, again, positioned therebetween.

A relative rotation of the measuring links M0, M1 about the X-axis (that is to say a movement corresponding substantially to a rotation about the parallel axis of rotation R) can in principle be captured by all of the measuring sensors 16.

A movement along the X-axis can be ascertained on the basis of a deviation of the distance signals that are captured by the two central or internal measuring sensors 16.

In the case of a rotation about the Z-axis, the external measuring sensors 16 supply measurement signals that run in opposite directions (i.e. indicate different directions of rotation).

Capturing yet further degrees of freedom (in particular a rotation about Y and/or a translation along Y and/or Z) does not necessarily have to take place. However, the topographies and in particular the central topography can be such that it reflects differently depending on the movement (rotation or translation). In particular, from the view of the central sensors 16, movement-dependent parallax effects can also occur, which make differentiation between rotation and translation possible, and thus for example a Y-translation is also capturable.

Finally, it should be noted that the distribution of measuring sensors 16 and measurement devices 18 within a measuring arrangement 14 effected for always in each case one of the measuring links M0-M6 in the above figures is not necessary. The measuring links M0-M6 can also have mixed forms, that is to say carry both measuring sensors 16 and measurement devices 18. For example with reference to FIG. 5, the external measuring sensors 16 could for example be positioned in each case at the zeroth measuring link M0 and the measurement devices 18 located there could instead be positioned at the first measuring link M1 (that is to say an inverse arrangement as compared to the variant shown could be provided there). The phrase at least one of A, B, and C should be construed to mean a logical (A OR B OR C), using a non-exclusive logical OR, and should not be construed to mean "at least one of A, at least one of B, and at least one of C."

The invention claimed is:

1. A positioning apparatus with a pose measurement function, the positioning apparatus comprising:
   a first kinematic link;
   a second kinematic link;
   a first measuring link attached to the second kinematic link;
   a joint that connects the first and second kinematic links;
   a measurement device; and
   a sensor configured to capture data indicative of pose of the measurement device relative to the sensor,
   wherein:
   a first one of the measurement device and the sensor is arranged at the first measuring link and is movable jointly with the second kinematic link relative to the first kinematic link,
   an other one of the measurement device and the sensor is arranged at least indirectly at the first kinematic link and is movable jointly with the first kinematic link relative to the second kinematic link,
   the second kinematic link includes a first end opposite a second end,
   the joint is proximate the first end,
   an attachment location of the first measuring link at the second kinematic link lies closer to the second end than to the first end, and
   the positioning apparatus is configured to ascertain, based on data captured by the sensor, a first relative pose value corresponding to a degree of freedom of the joint and a further relative pose value for another degree of freedom.

2. A coordinate measuring machine comprising the positioning apparatus of claim 1.

3. The positioning apparatus of claim 1, wherein the sensor is configured to optically capture the data indicative of the pose of the measurement device by at least one of (i) optically imaging the measurement device and (ii) capturing optical signals transmitted by the measurement device.

4. The positioning apparatus of claim 1, further comprising:
   a second measuring link attached to the first kinematic link,
   wherein the other one of the measurement device and the sensor is attached to the second measuring link.

5. The positioning apparatus of claim 1, wherein the first measuring link and the first kinematic link are not in contact with one another.

6. The positioning apparatus of claim 1, wherein the first measuring link is not directly connected to the joint.

7. The positioning apparatus of claim 1 wherein the first measuring link is received at least partially in a hollow body section of the second kinematic link.

8. The positioning apparatus of claim 1 wherein the sensor and the measurement device are arranged opposite one another in a region of the joint.

9. The positioning apparatus of claim 1 wherein an absolute pose value of at least one reference location of the positioning apparatus is determined based on at least one of the relative pose values.

10. The positioning apparatus of claim 9, further comprising:
    a third kinematic link;
    a second measuring link; and
    a second joint that connects the third kinematic link to the second kinematic link, wherein:
    the positioning apparatus is configured to ascertain a relative pose value between the first and second measuring links, and
    the absolute pose value of the reference location is determined based on the relative pose value.

11. The positioning apparatus of claim 1 wherein:
    the joint comprises a pose sensor, and
    a final pose value is ascertainable based both on measurement values from the pose sensor and on the first and further relative pose values captured by the sensor.

12. The positioning apparatus of claim 1 further comprising:
    a radiation source configured to generate electromagnetic radiation as a signal of the measurement device,
    wherein the sensor is configured to capture the radiation.

13. The positioning apparatus of claim 1 wherein the sensor is spatially resolving.

14. The positioning apparatus of claim 1 wherein a relative arrangement of the sensor and the measurement device is ascertainable based on the data captured by the sensor.

15. The positioning apparatus of claim 1, wherein:
    the first relative pose value relates to a bending degree of freedom, and
    the sensor is arranged closer to the attachment location than to the joint.

16. The positioning apparatus of claim 15, further comprising:
a second sensor,
wherein the relative pose value is ascertained based on a difference of respective capturing results of the sensor and the second sensor.

17. The positioning apparatus of claim 1, further comprising:
a plurality of sensors including the sensor,
wherein relative pose values with respect to six spatial degrees of freedom are ascertainable based on the plurality of sensors.

18. The positioning apparatus of claim 1, wherein the positioning apparatus is a robot configured to measure objects.

19. A method for operating a positioning apparatus having a first kinematic link, a second kinematic link, a first measuring link attached to the second kinematic link, a joint connecting the first and second kinematic links, a measurement device, and a sensor, wherein a first one of the measurement device and the sensor is arranged at the first measuring link and is movable jointly with the second kinematic link relative to the first kinematic link, wherein an other one of the measurement device and the sensor is arranged at least indirectly at the first kinematic link and is movable jointly with the first kinematic link relative to the second kinematic link, wherein the second kinematic link has a first end opposite a second end, wherein the joint is proximate the first end, and wherein an attachment location of the first measuring link at the second kinematic link lies closer to the second end than to the first end, the method comprising:
sensing, using the sensor, data indicative of pose of the measurement device relative to the sensor; and
ascertaining at least one relative pose value based on the sensing.

20. The method of claim 19, further comprising:
fixing, using the positioning apparatus, a relative arrangement, with respect to an object to be measured, of at least one of the positioning apparatus, a tool attached to the positioning apparatus, and a measuring sensor attached to the positioning apparatus; and
ascertaining a measurement value relating to the object, taking into account the relative pose value,
wherein the measurement value includes an object coordinate value.

21. The positioning apparatus of claim 3, wherein:
the measurement device includes an optically capturable mark; and
the sensor is configured to optically capture the data indicative of the pose of the measurement device by optically imaging the optically capturable mark.

* * * * *